(12) United States Patent
Zoller et al.

(10) Patent No.: US 11,980,984 B2
(45) Date of Patent: May 14, 2024

(54) REPROCESSING APPARATUS AND METHOD FOR REPROCESSING TOOLS, TOOL HOLDERS AND/OR TOOL UNITS

(71) Applicant: E. Zoller GmbH & Co. KG Einstell- und Messgeraete, Pleidelsheim (DE)

(72) Inventors: Alexander Zoller, Pleidelsheim (DE); Christian Pfau, Ingersheim (DE); Andreas Reichardt, Sachsenheim (DE)

(73) Assignee: E. ZOLLER GMBH CO. KG EINSTELL- UND MESSGERAETE, Pleidelsheim (DE)

( * ) Notice: Subject to any disclaimer, the term of this patent is extended or adjusted under 35 U.S.C. 154(b) by 331 days.

(21) Appl. No.: 17/469,633

(22) Filed: Sep. 8, 2021

(65) Prior Publication Data
US 2022/0097189 A1 Mar. 31, 2022

(30) Foreign Application Priority Data
Sep. 25, 2020 (DE) ...................... 10 2020 125 141.6

(51) Int. Cl.
 *B23Q 11/00* (2006.01)
 *B23Q 17/22* (2006.01)
 (Continued)

(52) U.S. Cl.
 CPC ........ *B23Q 11/005* (2013.01); *B23Q 17/2216* (2013.01); *B08B 3/02* (2013.01); (Continued)

(58) Field of Classification Search
 CPC ...... B23Q 17/2216; B23Q 7/04; B23Q 1/621; B23Q 11/02; B23Q 11/005; B08B 3/022; B08B 3/02; B08B 2230/01
 See application file for complete search history.

(56) References Cited

FOREIGN PATENT DOCUMENTS

| DE | 102014103542 A1 | 9/2014 |
|---|---|---|
| DE | 102017119107 A1 | 2/2019 |

(Continued)

OTHER PUBLICATIONS

Machine translation of WO-2019038190-A1 to Zoller et al. (Feb. 2019). (Year: 2019).*

(Continued)

*Primary Examiner* — Benjamin L Osterhout
(74) *Attorney, Agent, or Firm* — Womble Bond Dickinson (US) LLP

(57) ABSTRACT

A reprocessing apparatus, in particular a cleaning and/or preserving apparatus, for tools, tool holders and/or tool units is proposed, with at least one reprocessing unit, in particular for a reprocessing of used and/or contaminated tools, tool holders and/or tool units, with at least one holding unit for an exchangeable holding of the tools, tool holders and/or tool units, and with at least one handling unit which is configured, for an execution of a cleaning process on the tools, tool holders and/or tool units, to bring the holding unit and at least one cleaning region of the reprocessing unit together in an at least semiautomated manner, and after execution of the cleaning process, to remove the holding unit and the cleaning region of the reprocessing unit from each other in an at least semiautomated manner, and/or after execution of the cleaning process, to bring the holding unit and at least one further cleaning region of the reprocessing unit together for an execution of a further cleaning process.

22 Claims, 9 Drawing Sheets

Figure 1:
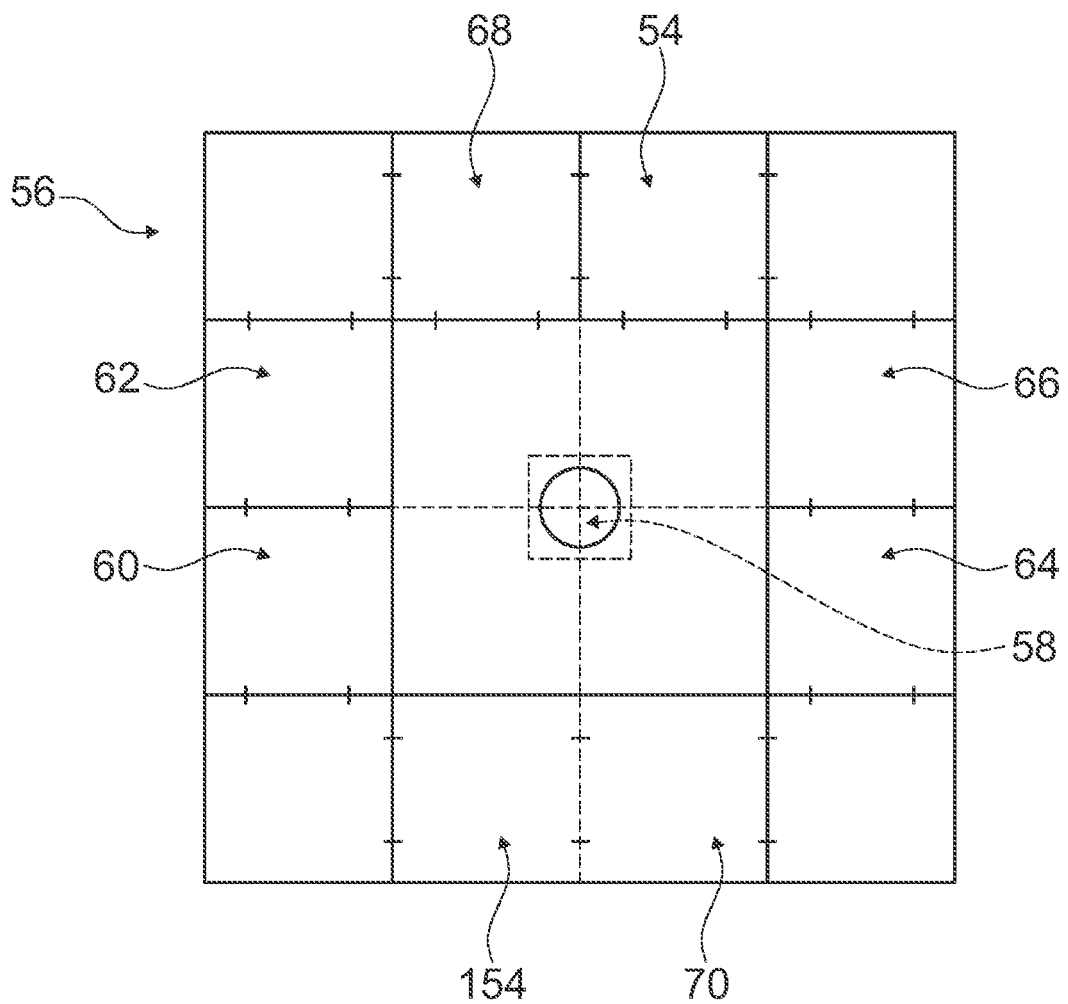

(51) Int. Cl.
    *B08B 3/02*           (2006.01)
    *B23Q 1/62*          (2006.01)
    *B23Q 7/04*          (2006.01)
    *B23Q 11/02*        (2006.01)

(52) U.S. Cl.
    CPC ........... *B08B 3/022* (2013.01); *B08B 2230/01* (2013.01); *B23Q 1/621* (2013.01); *B23Q 7/04* (2013.01); *B23Q 11/02* (2013.01)

(56) References Cited

FOREIGN PATENT DOCUMENTS

| | | |
|---|---|---|
| DE | 202020100819 U1 | 4/2020 |
| EP | 2193879 A1 | 6/2010 |
| JP | 2015058378 A | 3/2015 |
| WO | WO-2019038190 A1 * | 2/2019 |

OTHER PUBLICATIONS

German Search Report on the Patentability of Application No. DE 10 2020 124 141.6 (113598P002DE) Mailed Jun. 18, 2021, 20 pages.

Extended European Search Report on the Patentability of Application No. EP21193095.3, Mailed Jan. 28, 2022, 15 pages.

* cited by examiner

REPROCESSING APPARATUS AND METHOD FOR REPROCESSING TOOLS, TOOL HOLDERS AND/OR TOOL UNITS

STATE OF THE ART

The invention concerns a reprocessing apparatus according to claim 1, a system with the reprocessing apparatus according to claim 21 and a method for reprocessing according to claim 22.

It has already been proposed that tools, tool holders and/or tool units are reprocessed, for example cleaned and/or preserved, after use.

The objective of the invention is in particular to provide a generic apparatus with advantageous reprocessing characteristics for a reprocessing of tools, tool holders and/or tool units. The objective is achieved according to the invention by the features of patent claims 1, 21 and 22 while advantageous implementations and further developments of the invention may be gathered from the subclaims.

ADVANTAGES OF THE INVENTION

A reprocessing apparatus, in particular a tool and/or tool holder reprocessing apparatus, preferably a cleaning and/or preserving apparatus, for tools, tool holders and/or tool units is proposed, with at least one reprocessing unit, in particular for a reprocessing of used and/or contaminated tools, tool holders and/or tool units, with at least one holding unit for an exchangeable holding of the tools, tool holders and/or tool units, and with at least one handling unit which is configured, for an execution of a cleaning process on the tools, tool holders and/or tool units, to bring the holding unit and at least one cleaning region of the reprocessing unit together in an at least semiautomated manner, the handling unit being configured, after execution of the cleaning process, to remove the holding unit and the cleaning region of the reprocessing unit from each other in an at least semiautomated manner, and/or the handling unit being configured, after execution of the cleaning process, to bring the holding unit and at least one further cleaning region of the reprocessing unit together for an execution of a further cleaning process. In this way in particular an advantageous tool reprocessing is enabled. Advantageously, an at least semiautomated, preferably at least two-stage, reprocessing of tools, tool holders and/or tool units is achievable. Advantageously, particularly thorough and/or comprehensive cleaning is enabled. As a result, a long lifetime of the tools, the tool holders and/or the tool units is advantageously achievable.

The reprocessing apparatus is in particular realized as a tool and/or tool holder reprocessing apparatus, preferably as a cleaning and/or preserving apparatus of tools and/or tool holders. By a "tool holder" is in particular a component to be understood which is configured for an accommodation of a tool and/or for a connection of the tool to a machine. In particular, the tool holder is implemented as a tool-machine interface. Preferably the tool holder is implemented as a tool chuck, for example as a shrink-clamp chuck, as a hydraulic expansion chuck, as a compression-clamp chuck, as a collet chuck, or the like. The tools are embodied as machining tools for use on CNC machines. The tools may, for example, be embodied as shaft tools, preferably as rotary shaft tools, for example drills, milling tools, profiling tools and/or reamers, wherein preferably a shaft of the shaft tools is configured to be mounted in a tool holder. The tool could moreover be implemented as a tool assembly, for example as a fix combination of tool and tool holder. A "tool unit" in particular comprises a tool and a tool holder, wherein preferably the tool is mounted in the tool holder in a pull-out resistant manner. "Configured" is in particular to mean specifically programmed, designed and/or equipped. By an object being configured for a certain function is in particular to be understood that the object fulfills and/or executes said certain function in at least one application state and/or operation state.

In particular, the holding unit is configured for an exchangeable hold at least for tool holders of the sizes HSK 40 to HSK 100 and/or tool holders of other types, e. g. SK, Coromant Capto®, KM, or the like. The holding unit is in particular configured for gripping the tool, the tool holder and/or the tool unit. Preferably the holding unit comprises a gripper unit, which is preferentially configured for gripping a tool chuck. For example, the gripper unit grips an HSK chuck inside the HSK shaft. For example, the gripper unit grips an SK chuck by its pull stud. By an "exchangeable hold" is in particular to be understood that the holding unit is configured for picking up several tool holders one by one, in particular several different tool holders, for example tool holders of different sizes or types, and to release them one by one. In particular, the holding unit is configured to hold tool holders of different sizes or types. The handling unit is in particular implemented as a handling device and/or handling robot. The handling unit is configured to handle a material flow, in particular a flow of tools, tool holders and/or tool units, to an operative point that is realized as a reprocessing unit. The holding unit is movable, in particular by means of the handling unit, preferentially relative to the cleaning region, at least along a movement axis, preferably at least along two different movement axes, which are preferably at least substantially perpendicular to each other. Alternatively or additionally, the cleaning region is movable, in particular by means of the handling unit, preferentially relative to the cleaning region, at least along a movement axis, preferably at least along two different movement axes, which are preferably at least substantially perpendicular to each other. It is however also conceivable that only the holding unit is movable and the cleaning region is fixed, or that only the cleaning region is movable and the holding unit is fixed. In the cleaning process, in particular a cleanness of the cleaned component is restored. Preferably, in the cleaning process contaminant parts, for example oil residue, cooling agent residue, machining residue or the like are removed from the cleaned component. In particular, the handling unit is configured to remove the tool, the tool holder and/or the tool unit from a feed, for example from a tool wagon or from a pallet.

By a "semiautomated" function and/or movement of an object is in particular to be understood that at least a portion of a function or movement of the object is realized independently from a manual controlling by an operator. Preferably, the movement of the holding unit and/or of the cleaning region induced by the handling unit is realized in at least one spatial and/or rotational direction independently from a manual controlling by the operator. Preferentially, the reprocessing apparatus comprises a control and/or regulation unit, which is at least configured for controlling the handling unit. Especially preferably the handling unit is at least partially CNC-controlled and/or pneumatically controlled. By a "control and/or regulation unit" is in particular a unit with at least one control electronics component to be understood. A "control electronics component" is in particular to mean a unit with a processor unit, preferably a processor, and with a memory unit, preferably a storage medium, and with an operation program stored in the memory unit. The cleaning region and/or the further cleaning region are/is in particular implemented as a region that is configured for carrying out a cleaning process. Preferably the cleaning region and/or the further cleaning region comprise/comprises a cleaning device. Preferentially the cleaning region and the further cleaning region comprise cleaning devices which are implemented differently from each other and/or separately from each other. In particular, the cleaning device is arranged at least partly in the cleaning region. In particular, a further cleaning device is arranged at least partly in the further cleaning region. In particular, the cleaning device is arranged in the cleaning region in a positionally fix manner. In particular, the further cleaning device is arranged in the further cleaning region in a positionally fix manner. In particular, the cleaning device is immobile relative to the cleaning region. In particular, the further cleaning device is immobile relative to the further cleaning region. Preferably the cleaning device and/or the further cleaning device are/is free of movable parts. In particular, the cleaning region and the further cleaning region are free of overlap with each other.

In particular, the cleaning region and the further cleaning region adjoin each other directly. In particular, the cleaning region and the further cleaning region are configured for cleaning different subregions of the tool holder. In particular, the cleaning process and the further cleaning process are free of temporal overlap with each other.

Furthermore, it is proposed that the handling unit is configured to take the tools, the tool holders and/or the tool units into the cleaning region of the reprocessing unit in an at least semiautomated manner by a movement of the holding unit, and then, after execution of the cleaning process, to remove them from the cleaning region of the reprocessing unit in an at least semiautomated manner, and/or, after execution of the cleaning process, to take the tool, the tool holder and/or the tool unit into the further cleaning region of the reprocessing unit in an at least semiautomated manner for the purpose of an execution of the further cleaning process. In this way, in particular advantageous reprocessing of tools is enabled. Advantageously, an at least semiautomated, preferably at least two-stage, reprocessing of tools, tool holders and/or tool units is achievable. Advantageously, a simple implementation and/or controlling of the handling unit is achievable.

If the holding unit comprises at least the gripper unit, which is configured for gripping a tool unit, a tool and/or a tool holder, easy handling of the tool unit, the tool and/or the tool holder is advantageously achievable. Advantageously, handling of a plurality of different tool units, tools and/or tool holders, in particular the aforementioned tool holders, is achievable.

It is moreover proposed that the holding unit, preferably the gripper unit, is configured for holding and/or gripping a tool unit, a tool and/or a tool holder in such a way that an upper side of the tool, the tool holder and/or the tool unit points toward the cleaning region. This in particular enables an advantageous tool reprocessing. Advantageously, especially thorough cleaning is achievable. In particular, the tool unit, the tool and/or the tool holder are/is fastened in the holding unit in such a way that the tool unit, the tool and/or the tool holder point/s away from the holding unit, in particular from the gripper unit. In particular, the gripper unit grips the tool, the tool unit and/or the tool holder in each case on an underside. Preferably the gripper unit grips the tool by the tool shaft. Preferably, the gripper unit grips the tool holder and/or the tool unit in a region in which the tool holder is mounted to a machine tool. An "upper side of the tool" is in particular to mean a region of the tool, in particular the shaft tool, in which a work zone, for example a blade, of the tool is arranged. An "upper side of the tool holder" is in particular to mean a region of the tool holder in which a receiving region for an accommodation of the tool is arranged. By an "upper side of the tool unit" is in particular a region of the tool unit to be understood in which the tool is arranged.

It is further proposed that the handling unit, in particular the gripper unit, is configured to rotate a tool unit, a tool and/or a tool holder, which are/is held and/or gripped by the holding unit, relative to the reprocessing unit, in particular to rotate the tool unit, the tool and/or the tool holder around a main rotation axis of the tool and/or of the tool holder, preferably in one or in two rotation direction/s, by generating a rotation movement via the holding unit, preferably via the gripper unit. In this way, in particular advantageous tool processing is enabled.

Advantageously, particularly thorough cleaning is achievable. Advantageously, this allows an implementation of the cleaning device(s) that is as simple as possible. In particular, the handling unit comprises a rotation unit.

Beyond this it is proposed that the reprocessing apparatus comprises at least one, in particular vertical, movement axis, along which a tool unit held and/or gripped by the holding unit, a tool held and/or gripped by the holding unit and/or a tool holder held and/or gripped by the holding unit are/is movable in an at least semiautomated manner. In this way, in particular advantageous tool reprocessing is rendered possible. Advantageously, an at least semiautomated reprocessing of tools, tool holders and/or tool units is achievable. In particular, the holding unit is supported in such a way that it is (linearly) movable along a tower of the reprocessing apparatus.

If the reprocessing apparatus further comprises at least one further, in particular horizontal, movement axis, along which a tool unit held and/or gripped by the holding unit, a tool held and/or gripped by the holding unit and/or a tool holder held and/or gripped by the holding unit are/is movable in an at least semiautomated manner in a direction that is perpendicular to the, in particular vertical, movement axis, advantageous reprocessing of tools is achievable. Advantageously, an at least semiautomated reprocessing of tools, tool holders and/or tool units is achievable. Advantageously a high degree of flexibility of the reprocessing apparatus is achievable. In particular, the holding unit and/or the tower is supported on a (linearly) movable, preferably horizontal carriage. In particular, the handling unit is configured to transfer the tool, the tool holder and/or the tool unit from the cleaning region into the further cleaning region, preferably at least by a movement along the horizontal movement axis. In particular, the handling unit is configured to transfer the tool, the tool holder and/or the tool unit from the cleaning region and/or the further cleaning region into a preserving region of the reprocessing unit, preferably at least by a movement along the horizontal movement axis. In particular, the handling unit is configured to transfer the tool, the tool holder and/or the tool unit from the preserving region into a further preserving region of the reprocessing unit, preferably at least by a movement along the horizontal movement axis.

If the handling unit is moreover configured to move, in particular to move up and down and/or to rotate, the tool, the tool holder, the tool unit and/or the reprocessing unit during execution of the cleaning process, particularly effective, efficient and/or thorough cleaning is advantageously achievable.

In addition, it is proposed that the reprocessing unit comprises at least one cleaning unit with one or several cleaning region/s, and at least one preserving unit with at least one or several preserving region/s. In this way, in particular advantageous tool reprocessing is enabled. Advantageously, this allows achieving a long lifetime of the tools, the tool holders and/or the tool units. In particular, the cleaning unit is configured to carry out the cleaning process. In particular, the cleaning unit is configured to carry out the further cleaning process. In particular, the cleaning unit comprises at least the cleaning device and the further cleaning device. In particular, the preserving unit is configured for a preserving process of the cleaned objects that follows the cleaning process and/or the further cleaning process directly. In particular, the preserving unit is configured for a further preserving process directly following the preserving process. In particular, the preserving unit comprises the preserving region and the further preserving region, which is implemented separately therefrom. Preferentially, the preserving region and the further preserving region comprise preserving devices, which are implemented differently from each other and/or separately from each other. In particular, the preserving device is arranged at least partly in the preserving region. In particular, a further preserving device is arranged at least partly in the further preserving region. In particular, the preserving device is arranged in the preserving region in a positionally fix manner. In particular, the further preserving device is arranged in the further preserving region in a positionally fix manner. In particular, the preserving device is immobile relative to the preserving region. In particular, the further preserving device is immobile relative to the further preserving region. Preferably the preserving device and/or the further preserving device are/is free of movable parts. In particular, the preserving region and the further preserving region are free of overlap with each other. In particular, the preserving region and the further preserving region adjoin each other directly. In particular, the preserving region and the further preserving region are configured for a preserving of different subregions of the tool holder. In particular, a preserving process in the preserving region and the further preserving process in the further preserving region are free of temporal overlap with each other. In particular, one of the preserving regions and one of the cleaning regions adjoin each other directly. Preferably the preserving regions and the cleaning regions are arranged approximately at the same (vertical) level.

Furthermore, it is proposed that the cleaning region of the reprocessing unit is configured at least for a vapor cleaning of tools, tool holders and/or tool units, in particular of outer sides of the tools, the tool holders and/or the tool units. This advantageously allows achieving particularly thorough and/or resource-saving cleaning. Advantageously, even places which are difficult to access can be reached by the vapor. In particular, for cleaning the tools, tool holders and/or tool units are blown at with the vapor by the cleaning devices. Preferably the vapor is implemented as a water vapor. In addition, it is conceivable that the water vapor contains cleaning additives. Preferably the vapor is implemented as hot vapor. In particular, the cleaning device is embodied by one or several cleaning nozzle/s. In particular, the cleaning nozzle is oriented toward an interior of the cleaning region. In particular, the cleaning nozzle is configured to output cleaning vapor.

If additionally the further cleaning region of the reprocessing unit is configured at least for a cleaning, in particular for a vapor cleaning, of inner sides of tool holders, in particular of tool receiving openings or tool receiving regions of tool holders, like for example of collet bores, particularly thorough cleaning is advantageously achievable.

Advantageously, the further cleaning region comprises a cleaning lance, which is configured, in the cleaning process carried out on the tool holders, to engage at least partially into the inner sides of the tool holders, in particular into the tool receiving openings or tool receiving regions and/or collet bores of the tool holders. In this way, especially high thoroughness of cleaning is advantageously achievable. Advantageously, complete cleaning of a tool holder is achievable. The cleaning lance preferably projects into the further cleaning region, in particular in a vertical direction. The cleaning lance is in particular embodied as a thin elongate rod comprising, preferably on an upper end, in particular on an end facing toward the holding unit, one or several cleaning nozzle/s. In particular, at least one of the cleaning nozzles of the cleaning lance is arranged in a circumferential direction of the cleaning lance. In particular, at least one of the cleaning nozzles of the cleaning lance is oriented in an axial direction (upwards) of the cleaning lance. In particular, the cleaning lance is embodied as a backward-acting vapor nozzle. In particular, the cleaning lance is configured to engage into an opening of a tool, of a tool holder and/or of a tool unit, preferably into a tool receiving opening of the tool holder. Preferably the cleaning lance is configured to spray an interior of the tool receiving opening of the tool holder, which is normally configured to receive the tool shaft of a tool, with a cleaning vapor and preferably cleaning it in this way. Preferentially, during an activation of the spray function of the cleaning lance, the tool holder is moved up and down and/or rotated by the handling unit.

It is also proposed that the reprocessing apparatus comprises an enclosure, which delimits the cleaning region, and in particular the further cleaning region, directly or indirectly at least on five sides. This advantageously allows catching and/or collecting a distant contamination. Advantageously, a concentration of the cleaning vapor on the regions and/or components that are to be cleaned is achievable. In particular, the enclosure and/or the cleaning region are/is open towards the top, preferably towards the holding unit. In particular, the enclosure forms something like a tub, in particular a cleaning tub. In particular, the enclosure is configured to at least partly accommodate the tool holder, the tool and/or the tool unit at least during the cleaning process. In particular, the handling unit is configured to at least partly insert and/or immerge the tool holder, the tool and/or the tool unit into the enclosure, and then to remove them from the enclosure. The enclosure in particular encloses the cleaning region and the further cleaning region together on five sides. Herein, in particular the cleaning region and the further cleaning region are in each case delimited directly by the enclosure at least on four sides. The fifth side of one of the cleaning regions, which is delimited by the enclosure, may in each case directly adjoin the neighboring cleaning region, which is then delimited directly by the enclosure on this side. The fifth side is thus in particular delimited indirectly by the enclosure. In particular, a transition from the cleaning region to the further cleaning region is free of a partition or wall. In particular, the cleaning region and the further cleaning region are arranged directly next to each other along the horizontal movement axis of the reprocessing apparatus, in particular of the handling unit.

Furthermore, it is proposed that the reprocessing unit comprises at least one suction unit. This advantageously allows achieving high cleaning efficiency. Advantageously, contamination of the reprocessing unit, in particular of the cleaning region, can be prevented. As a result, an advantageously long, in particular maintenance-free, operating time of the reprocessing apparatus is enabled. In particular, the suction unit is configured to suction off dirt particles which were removed from the tool, from the tool holder and/or from the tool unit. In particular, the suction unit is connected to the cleaning region, in particular to the enclosure. In particular, the suction unit is configured to suction off dirt particles, cleaning vapor and/or cleaning liquid from the cleaning region and/or from the region enclosed by the enclosure. Preferably the suction unit suctions the cleaning regions starting from a lower portion of the cleaning region. Preferably, an inlet of the suction unit is arranged in a lower region of the enclosure. Alternatively or additionally, the suction unit may also be configured for a suctioning of the preserving region of the reprocessing unit. In particular, the suction unit is configured to suction off preserving liquid residue from the preserving region and/or from a region that is enclosed by a further enclosure. Preferably the suction unit suctions the preserving regions starting from a lower portion of the preserving region.

Beyond this it is proposed that the reprocessing unit comprises at least one separator, in particular an oil separator and/or water separator. This advantageously allows achieving high efficiency of the reprocessing unit. Advantageously, by recovery of the preserving agent (e. g. oil) from the preserving process, which does not remain on the tool, and/or by a reprocessing of the used-up cleaning agent from the cleaning process, consumption of resources can be minimized. As a result, costs of consumption materials can be kept at a low level. In particular, the separator is configured for a processing of the liquids suctioned off by the suction unit.

It is further proposed that the preserving region of the reprocessing unit is configured at least for a preserving of tools, tool holders and/or tool units, in particular of outer sides of the tools, the tool holders and/or the tool units, by spraying the tools, tool holders and/or tool units with a vaporized preserving liquid, preferably with an oil mist. In this way particularly comprehensive preserving is advantageously achievable. Advantageously, lifetime reduction, for example due to damages or rusting, can be avoided. In particular, the preserving device is embodied as one or several preserving nozzle(s). In particular, the preserving nozzle is oriented toward an interior of the preserving region. In particular, the preserving nozzle is configured to generate and/or output the vaporized preserving liquid, in particular the oil mist.

In addition, it is proposed that the reprocessing unit comprises at least one further preserving region, which is configured at least for a preserving of inner sides of tool holders, in particular of tool receiving openings or tool receiving regions of tool holders, like for example collet bores, preferably by spraying with an oil mist. The further preserving region in particular comprises a further preserving device of the preserving unit. The further preserving device is in particular embodied as a further preserving nozzle. The further preserving nozzle in particular has a main spraying direction which differs from a main spraying direction of the preserving nozzle. In particular, the main spraying direction of the further preserving nozzle is oriented at least substantially perpendicularly to the main spraying direction of the further preserving nozzle. In particular, the main spraying direction of the further preserving nozzle is oriented at least substantially vertically upwards. In particular, during the preserving process the main spraying direction of the further preserving nozzle points toward the holding unit. In particular, the further preserving nozzle is configured for spraying into the tool receiving opening of the tool holder.

If the further preserving region comprises a nozzle, in particular the further preserving nozzle, which is oriented at least substantially parallel to an, in particular vertical, movement axis of the tool holder held and/or gripped by the holding unit, preferably in the direction of a main extension of the tool receiving recess and/or collet bore of the tool holder held and/or gripped by the holding unit, an effective preserving of the tool holder is advantageously achievable, preferably comprising a preserving of the tool receiving opening and/or the tool receiving region of the tool holder.

It is moreover proposed that the reprocessing apparatus comprises a further enclosure, which directly or indirectly delimits the preserving region and in particular the further preserving region at least on five sides. As a result, it is advantageously possible to catch and/or collect a preserving liquid that does not remain on the tool, the tool holder and/or the tool unit. Advantageously, a concentration of the preserving liquid on the regions and/or components which are to be preserved is achievable. In particular, the further enclosure and/or the preserving region are/is open towards the top, preferably towards the holding unit. In particular, the further enclosure forms something like a tub, in particular a preserving tub. In particular, the further enclosure is configured to at least partly accommodate the tool holder, the tool and/or the tool unit at least during the preserving process. In particular, the handling unit is configured to at least partly insert and/or immerge the tool holder, the tool and/or the tool unit into the further enclosure and then to remove them from the further enclosure. In particular, the handling unit is configured to take the tool holder, the tool and/or the tool unit from the enclosure into the further enclosure. The further enclosure in particular encloses the preserving region and the further preserving region together on five sides. Herein, in particular the preserving region and the further preserving region are in each case delimited directly by the enclosure at least on four sides. The fifth side of one of the preserving regions, which is delimited by the further enclosure, may in each case directly adjoin the neighboring preserving region, which is then directly delimited by the enclosure on this side. The fifth side is thus in particular delimited by the further enclosure indirectly. In particular, a transition from the preserving region to the further preserving region is free of a partition or wall. In particular, the preserving region and the further preserving region are arranged directly next to each other along the horizontal movement axis of the reprocessing apparatus, in particular of the handling unit. In particular, the cleaning regions and the preserving regions are arranged directly next to each other along the horizontal movement axis of the reprocessing apparatus, in particular of the handling unit.

If the preserving region is arranged along the further, in particular horizontal, movement axis next to the cleaning region, in particular cleaning regions, preferably approximately at the same vertical level as the cleaning region/s, an especially simple sequence of cleaning process and preserving process is advantageously achievable. Advantageously, a high level of reprocessing efficiency is achievable.

Furthermore a system is proposed, with the reprocessing apparatus and with a handling robot for an automated loading of the reprocessing apparatus with tools, tool holders and/or tool units, and/or for a removal of tools, tool holders and/or tool units from the reprocessing apparatus, and with one or several devices from the following list of devices:

- tool clamping-in device for an at least semiautomated clamping-in of tools in tool holders,
- measuring and/or presetting apparatus for tools for an at least semiautomated presetting and/or measuring of tools, tool holders and/or tool units,
- shrink-clamping device for an at least semiautomated inductive, thermal clamping-in and/or clamping-out of tools into and/or out of tool holders,
- cooling apparatus for an at least semiautomated cooling of previously heated tool holders or tool units,
- tool assembly device for an at least semiautomated assembly of multi-part tools,
- balancing station for an at least semiautomated balancing of tool units. In this way it is in particular possible to create a comprehensive tool handling system with an advantageous tool reprocessing possibility. Advantageously, an at least semiautomated reprocessing of tools, tool holders and/or tool units is achievable. It is conceivable that the reprocessing apparatus is integrated in a superordinate device, for example in a multi-clamping and measuring and/or presetting station for tools, like the one described in the German patent application having the application number 10 2019 115 607.6. In particular, the system may be realized as a multi-clamping and measuring and/or presetting station like the one described in the German patent application having the application number 10 2019 115 607.6.

By a "handling robot" is in particular an industrial robot to be understood, preferably an articulated-arm robot, in particular having at least three, preferentially at least four, preferably at least five and particularly preferentially at least six robot joints which are movable independently from each other. In particular, the handling robot is implemented differently and/or separately from the handling unit of the reprocessing apparatus. By a "tool clamping-in device" is in particular a device to be understood which is configured for a mounting of a tool in a tool holder and/or for a demounting of a tool from a tool holder. The tool clamping-in device in particular forms a tool clamping-in and/or tool clamping-out device. In particular, the tool clamping-in device is configured to activate, in particular adjust, a clamping mechanism of a tool holder, and/or to deactivate, in particular release, the clamping mechanism of the tool holder. It is moreover conceivable that the system comprises a plurality of different tool clamping-in devices, which are configured for different tool clamping methods. In particular, the handling robot is configured to load the tool clamping-in devices, i. e. in particular to insert tools and/or tool holders into the tool clamping-in devices and/or to remove them from the tool clamping-in devices. By a "measuring and/or presetting apparatus for tools" is in particular an apparatus to be understood which is at least configured to at least partially, in particular optically, capture and/or preset at least a length, at least an angle, at least a contour and/or at least an outer shape of a tool. The handling robot is in particular configured to load the measuring and/or presetting apparatus for tools.

The shrink-clamping device is in particular configured for a fixation of a tool in a tool holder, in particular via shrink-clamping-in, and/or for a removal of the tool from the tool holder, in particular via shrink-clamping-out. Preferably the shrink-clamping device comprises at least one induction heating unit for a heating of a tool receiving region of a tool holder, which surrounds a tool receiving opening.

The shrink-clamping device is in particular configured, in a shrink-clamping, for a thermal expansion of the tool receiving opening of the tool holder in order to increase a size, in particular a diameter, of the tool receiving opening in such a way that a tool fits into the tool receiving opening. Preferably, due to a subsequent cooling down of the tool holder the size, in particular the diameter, of the tool receiving opening is decreased once again, thus creating a force-fit connection between the tool holder and the tool. Preferably the cooling apparatus is configured to cool the tool holder, in particular following a heating by means of the induction heating unit, preferably down to a lukewarm temperature. In particular, the handling robot is configured to load the shrink-clamping device, i. e. in particular to insert tools and/or tool holders into the shrink-clamping device and/or to remove tools and/or tool holders from the shrink-clamping device.

Beyond this a method for reprocessing, in particular for cleaning and/or preserving, tools, tool holders and/or tool units by means of the reprocessing apparatus is proposed. In this way in particular advantageous tool reprocessing is enabled.

If in the method for reprocessing, in a cleaning step and/or in a preserving step, the tool, the tool holder and/or the tool unit are/is rotated and/or moved up and down within at least one of the cleaning regions and/or of the preserving regions, an especially advantageous, in particular thorough, cleaning and/or preserving, in particular even of complicated surfaces, are/is achievable.

If moreover, in the method for reprocessing, between the cleaning step and the preserving step, the tool, the tool holder and/or the tool unit are/is taken, in particular in an automated manner, from one of the cleaning regions into one of the preserving regions, particularly high efficiency is achievable. Advantageously a high cycle rate is achievable.

The reprocessing apparatus according to the invention, the system according to the invention and/or the method according to the invention are herein not to be limited to the application and implementation described above. In particular, in order to fulfil a functionality that is described here, the reprocessing apparatus according to the invention, the system according to the invention and/or the method according to the invention may comprise a number of individual elements, components, method steps and units that differs form a number given here.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features separately and will find further expedient combinations.

Figure 2:
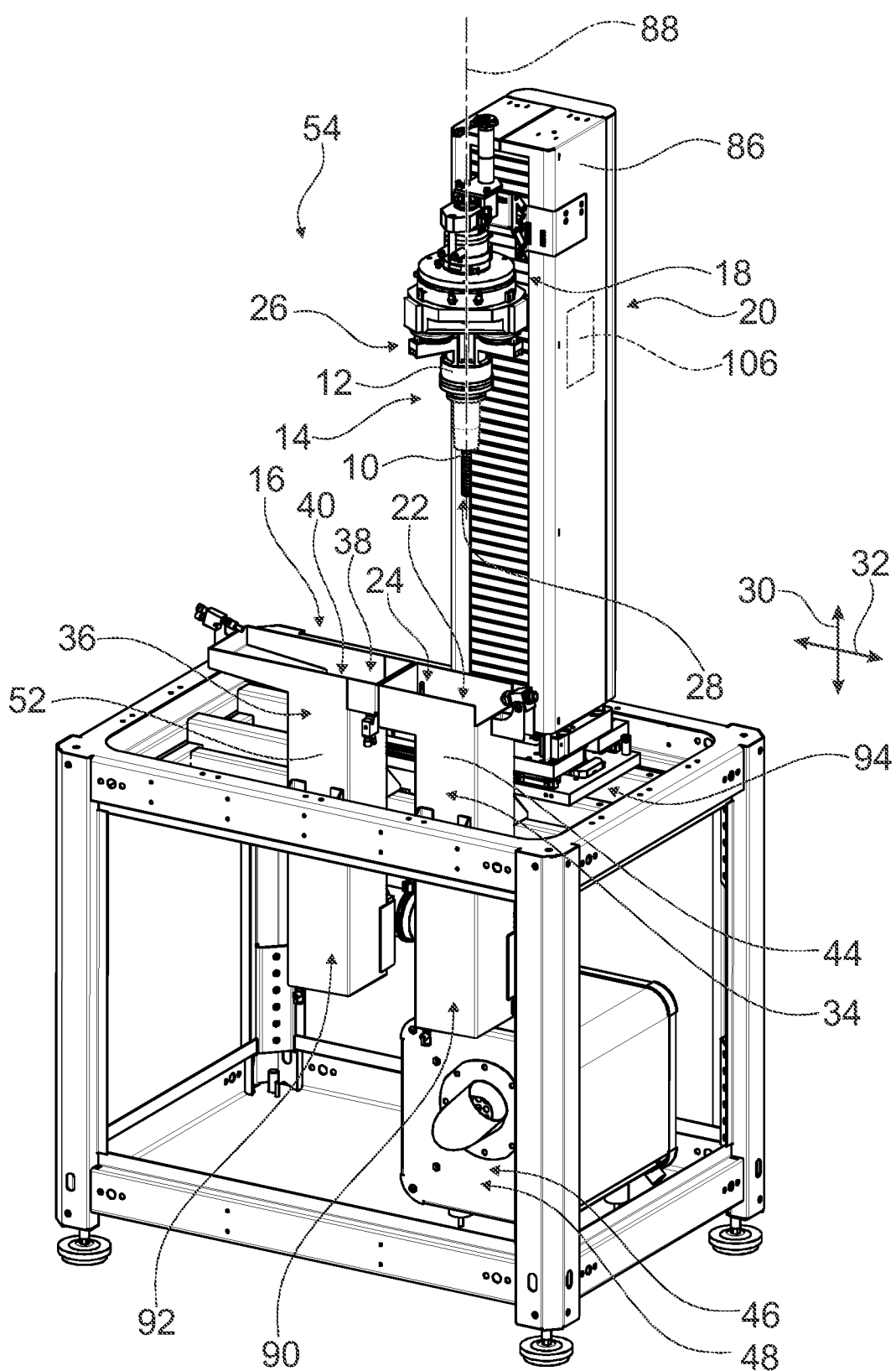
Figure 3:
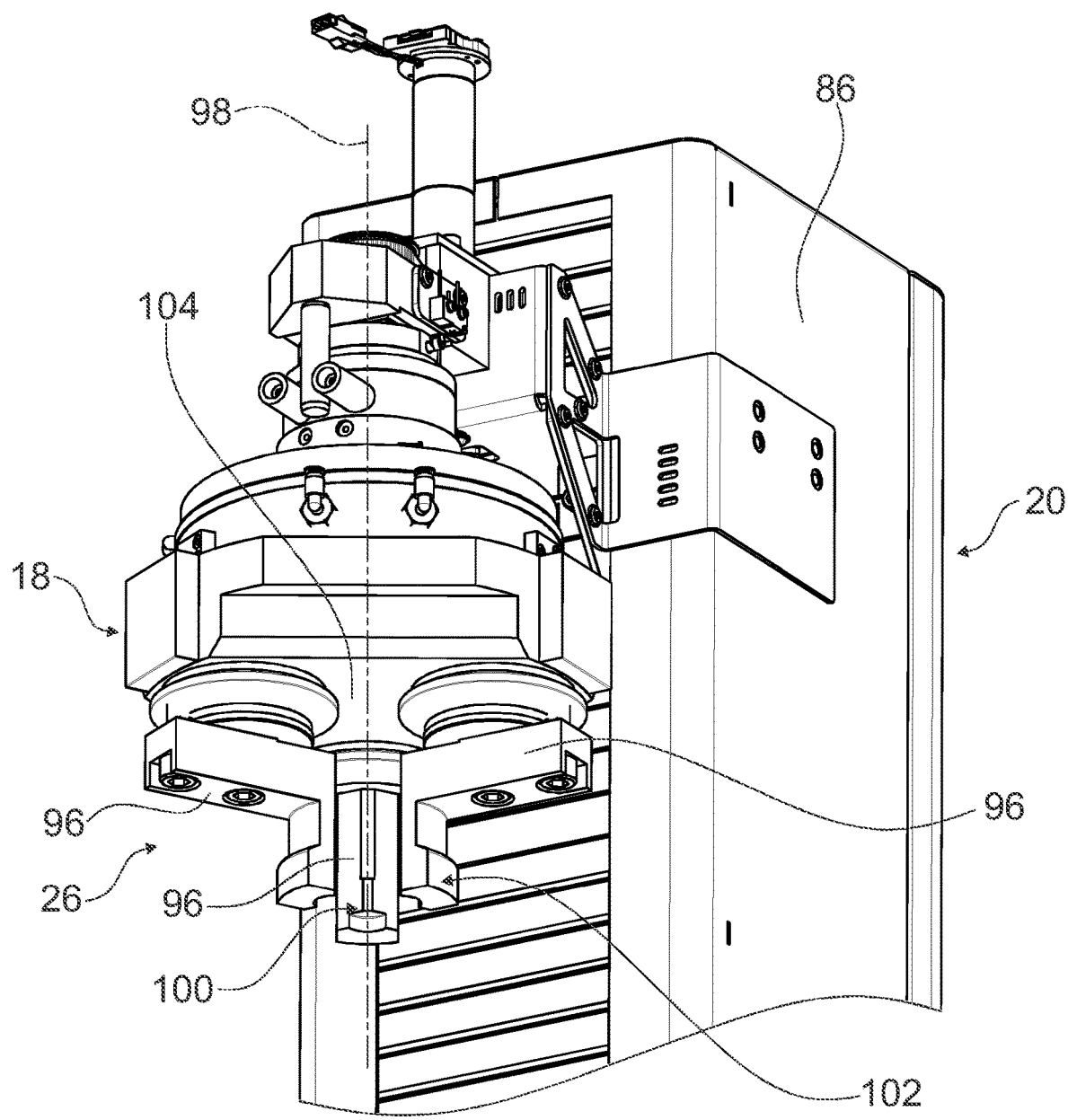
Figure 4:
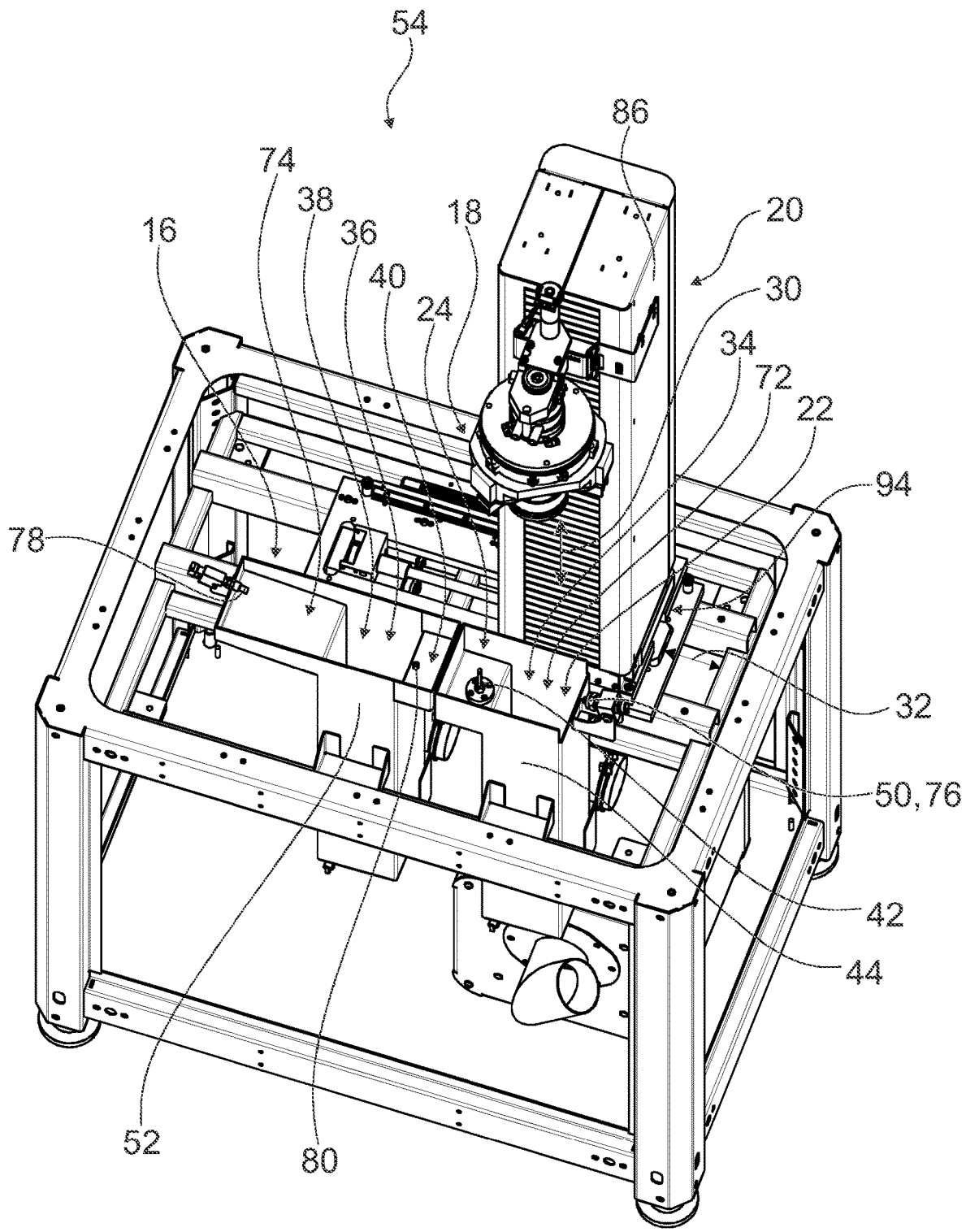
Figure 5:
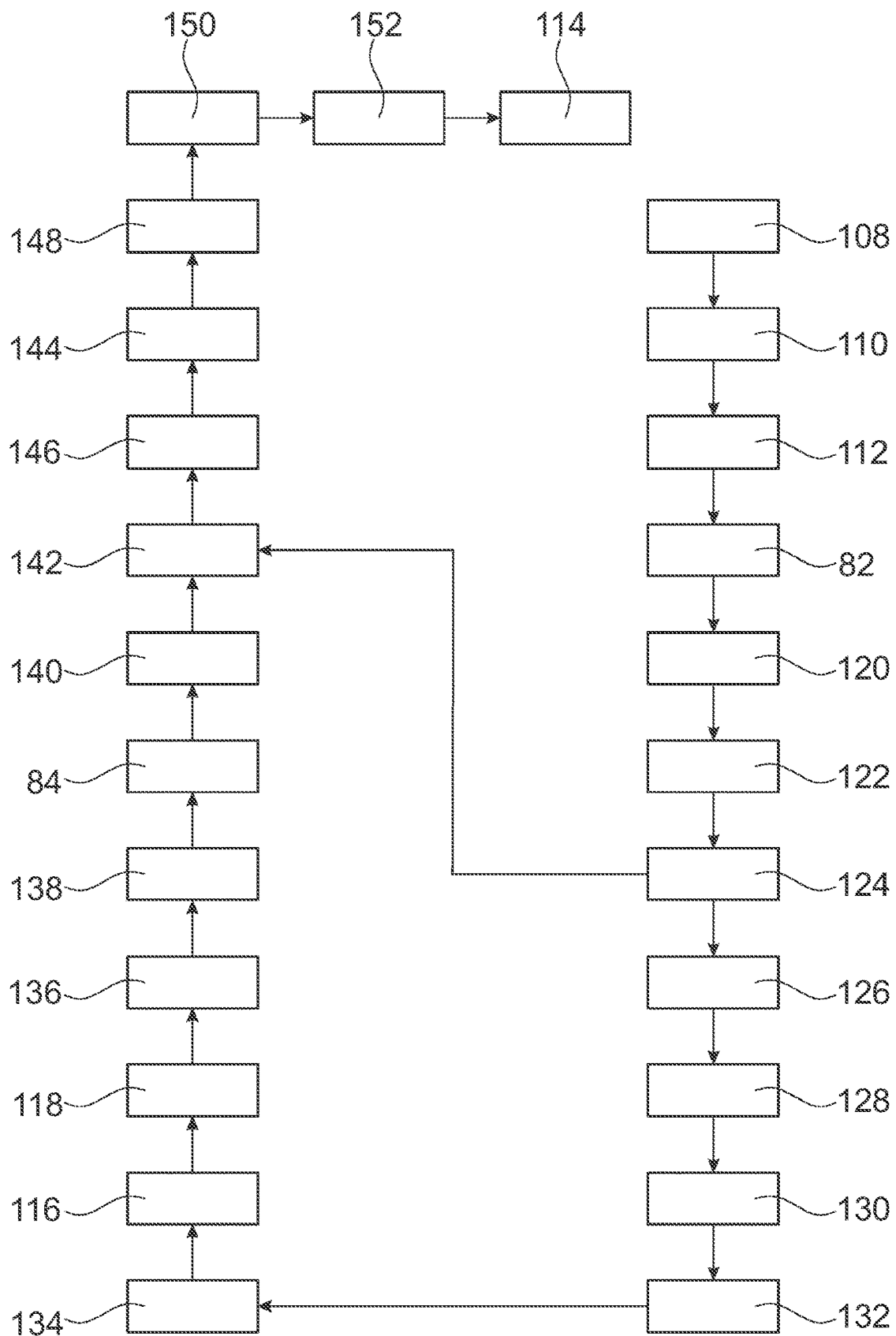

It is shown in:

FIG. 1 a schematic illustration of a system with a reprocessing apparatus,

FIG. 2 a schematic perspective view of the reprocessing apparatus,

FIG. 3 a schematic perspective detail view of a holding unit of the reprocessing apparatus, FIG. 4 a schematic illustration of an enlarged section, shown in perspective, of the reprocessing apparatus with cleaning regions and with preserving regions, FIG. 5 a schematic flow chart of a method for reprocessing, and FIGS. 6a-6h the reprocessing apparatus in different operation states during an execution of the method for reprocessing.

DESCRIPTION OF THE EXEMPLARY EMBODIMENT

FIG. 1 schematically shows a system 56, which is realized as a multi-clamping and measuring and/or presetting station like the one described in the German patent application having the application number 10 2019 115 607.6. In addition to a multi-clamping and measuring and/or presetting station from the German patent application having the application number 10 2019 115 607.6, the system 56 comprises a reprocessing apparatus 54 (cf., among others, FIG. 2). The system 56 comprises a handling robot 58. The handling robot 58 is positioned in a central position of the system 56, permitting the handling robot 58 access to all devices of the system 56 which are listed below. The handling robot 58 is configured for an automated loading of the reprocessing apparatus 54 and/or of all further devices of the system 56 with tools 10, tool holders 12 and/or tool units 14 (cf. FIG. 2). The handling robot 58 is configured for a removal of tools 10, tool holders 12 and/or tool units 14 from the reprocessing apparatus 54 and/or from all further devices of the system 56. The system 56 comprises tool clamping-in devices 60 for an at least semiautomated clamping-in of tools 10 in tool holders 12. The system 56 may comprise further tool clamping-in devices 154 for further clamping-in methods. The system 56 comprises a measuring and/or presetting apparatus 62 for tools 10 for an at least semiautomated presetting and/or optical measuring of tools 10, tool holders 12 and/or tool units 14. The system 56 comprises a shrink-clamping device 64 for an automated inductive thermal clamping-in and/or clamping-out of tools 10 into and/or out of tool holders 12. The system 56 comprises a cooling apparatus 66 for an automated cooling of previously heated tool units 14. The system 56 comprises a tool assembly device 68 for an automated assembly of multi-part tools 10. The system 56 comprises a balancing station 70 for an at least semiautomated balancing of tool units 14.

FIG. 2 shows a schematic perspective view of the reprocessing apparatus 54 for tools 10, tool holders 12 and/or tool units 14. The reprocessing apparatus 54 is implemented as a cleaning and/or preserving apparatus for tools 10, tool holders 12 and/or tool units 14. The reprocessing apparatus 54 comprises a reprocessing unit 16. The reprocessing unit 16 is configured for a reprocessing, in particular for a cleaning and subsequent preserving, of used and/or contaminated tools 10, tool holders 12 and/or tool units 14. The reprocessing unit 16 comprises a holding unit 18. The holding unit 18 is configured for an exchangeable holding of the tools 10, the tool holders 12 and/or the tool units 14 (cf. also FIG. 3). The reprocessing unit 16 comprises a handling unit 20. The handling unit 20 is configured, for an execution of a cleaning process on the tools 10, the tool holders 12 and/or the tool units 14, to bring the holding unit 18 and at least one cleaning region 22 of the reprocessing unit 16 together in an automated manner. The handling unit 20 is further configured, following the execution of the cleaning process, to remove the holding unit 18 and the cleaning region 22 from each other in an automated manner. The handling unit 20 is moreover configured, following the execution of the cleaning process and after removal of the holding unit 18 from the cleaning region 22, to bring the holding unit 18 and a further cleaning region 24 of the reprocessing unit 16 together for an execution of a further cleaning process.

In the exemplary embodiment that is shown by way of example, only the handling unit 20 is supported movably, and the cleaning regions 22, 24 are fixated in the space. However, alternatively to the movable support of the handling unit 20 or in addition to the movable support of the handling unit 20, the cleaning regions 22, 24 could of course also be supported movably. However, in the reprocessing apparatus 54 shown in the figures by way of example, the handling unit 20 is configured to take the tools 10, the tool holders 12 and/or the tool units 14 into the cleaning region 22 of the reprocessing unit 16 automatedly by a movement of the holding unit 18, to remove them automatedly from the cleaning region 22 of the reprocessing unit 16 following an execution of the cleaning process and, after the execution of the cleaning process and after the removal from the cleaning region 22, to take them automatedly into the further cleaning region 24 of the reprocessing unit 16 for an execution of the further cleaning process. The holding unit 18 is herein configured to hold and/or grip the tool unit 14, the tool 10 and/or the tool holder 12 in such a way that an upper side 28 of the tool 10, the tool holder 12 and/or the tool unit 14 points toward the cleaning region 22, 24.

The reprocessing apparatus 54 comprises a vertical movement axis 30, along which a tool unit 14 held and/or gripped by the holding unit 18, a tool 10 held and/or gripped by the holding unit 18 and/or a tool holder 12 held and/or gripped by the holding unit 18 are/is movable in an automated manner. The reprocessing apparatus 54, in particular the handling unit 20, comprises a tower 86, along which the holding unit 18 is supported in a vertically movable manner. The movement axis 30 runs at least substantially parallel to a vertical extent of the tower 86. The handling unit 20 comprises a linear guide arranged in the tower 86 for an up-and-down movement of the holding unit 18 relative to the cleaning regions 22, 24.

The handling unit 20 is furthermore configured to rotate the tool unit 14, the tool 10 and/or the tool holder 12, which are/is held and/or gripped by the holding unit 18, relative to the reprocessing unit 16. The handling unit 20 is configured to rotate the tool unit 14, the tool 10 and/or the tool holder 12 around a respective provided rotation axis 88 (tool rotation axis and/or tool holder rotation axis). The handling unit 20 is configured to move the tool 10, the tool holder 12 and/or the tool unit 14 during execution of the cleaning process. The handling unit 20 is configured to move the tool 10, the tool holder 12 and/or the tool unit 14 up and down during execution of the cleaning process. The handling unit 20 is configured to rotate the tool 10, the tool holder 12 and/or the tool unit 14 during execution of the cleaning process. Alternatively or additionally, it is however also conceivable that the cleaning region 22 is movable, in particular movable up and down, during execution of the cleaning process.

The cleaning region 22 and the further cleaning region 24 are arranged so as to adjoin each other directly. The cleaning region 22 and the further cleaning region 24 are arranged next to each other along a horizontal direction of the reprocessing apparatus 54. The cleaning region 22 and the further cleaning region 24 merge into each other, in particular without barriers. The reprocessing apparatus 54, in particular the reprocessing unit 16, comprises an enclosure 44. The enclosure 44 delimits the cleaning region 22 and the further cleaning region 24 on five sides. The cleaning regions 22, 24 delimited by the enclosure 44 are open merely towards the top and towards the respectively other, neighboring cleaning region 22, 24. For an execution of the cleaning process, the handling unit 20 is configured to immerge, by means of a movement of the holding unit 18, the tool 10, the tool holder 12 and/or the tool unit 16, preferably one by one, into the cleaning regions 22, 24 enclosed by the enclosure 44 and then to remove the tool 10, the tool holder 12 and/or the tool unit 14 therefrom, preferably one by one. The reprocessing unit 16 comprises a suction unit 46. The suction unit 46 is connected to the enclosure 44, for example via a hose or a tube (not shown). The suction unit 46 is configured for removing particles, vapors and/or liquids from the cleaning regions 22, 24. The suction unit 46 is configured to suction particles, vapors and/or liquids from the region enclosed by the enclosure 44. The suction unit 46 is connected to an underside 90 of the enclosure 44. The suction unit 46 suctions the cleaning regions 22, 24, viewed in a vertical direction, from below. The reprocessing unit 16 comprises a separator 48. The separator 48 is connected to the suction unit 46. The separator 48 constitutes a subcomponent of the suction unit 46. The separator 48 is configured to at least partly separate the particles, vapors and/or liquids suctioned off by the suction unit 46 into their components and/or to recycle said particles, vapors and/or liquids.

The reprocessing unit 16 comprises a cleaning unit 34. The cleaning unit 34 comprises the cleaning region 22 and the further cleaning region 24. The reprocessing unit 16 comprises a preserving unit 36. The preserving unit 36 comprises a preserving region 38. The preserving unit 36 comprises a further preserving region 40. The preserving region 38 and the further preserving region 40 are arranged directly adjoining each other. The preserving region 38 and the further preserving region 40 are arranged next to each other along a horizontal direction of the reprocessing apparatus 54. The preserving region 38 and the further preserving region 40 merge into each other, in particular without barriers. The reprocessing apparatus 54, in particular the reprocessing unit 16, comprises a further enclosure 52. The further enclosure 52 is implemented separately from the enclosure 44. The further enclosure 52 delimits the preserving region 38 and the further preserving region 40 on five sides. The preserving regions 38, 40 delimited by the further enclosure 52 are open only toward the top and toward the respective other, neighboring preserving region 38, 40. For the execution of a preserving process, the handling unit 20 is configured to immerge, by means of a movement of the holding unit 18 along the movement axis 30, the tool 10, the tool holder 12 and/or the tool unit 14, preferably one by one, into the preserving regions 38, 40 which are enclosed by the further enclosure 52, and then to remove the tool 10, the tool holder 12 and/or the tool unit 14 from the preserving regions 38, 40. The suction unit 46 is connected to the further enclosure 52, for example via a hose or a tube (not shown). The suction unit 46 is configured to remove particles, vapors and/or liquids from the preserving regions 38, 40. The suction unit 46 is configured to suction off particles, vapors and/or liquids from the region that is enclosed by the further enclosure 52. The suction unit 46 is connected to an underside 92 of the further enclosure 52. The suction unit 46 suctions the preserving regions 38, 40 from below, viewed in a vertical direction. The preserving regions 38, 40 are arranged in a horizontal direction of the reprocessing apparatus 54 next to the cleaning regions 22, 24. The preserving regions 38, 40 are arranged separately from the cleaning regions 22, 24.

The reprocessing apparatus 54, in particular the handling unit 20, has a further movement axis 32. The further movement axis 32 is a horizontal movement axis. The further movement axis 32 runs perpendicularly to the movement axis 30. The tool unit 14 held and/or gripped by the holding unit 18, the tool 10 held and/or gripped by the holding unit 18 and/or the tool holder 12 held and/or gripped by the holding unit 18 are/is automatedly movable along the further movement axis 32 by means of the handling unit 20. The handling unit 20 comprises a carriage 94, which is supported so as to be horizontally movable along the further movement axis 32. The tower 86 is mounted on the carriage 94. The tower 86 is horizontally movable along the further movement axis 32 via the carriage 94. The holding unit 18 is thus supported such that it is movable by the handling unit 20 in the horizontal direction and in the vertical direction. The cleaning region 22 and the further cleaning region 24 are arranged along the further movement axis 32 next to each other. The preserving region 38 and the further preserving region 40 are arranged along the further movement axis 32 next to each other. The preserving regions 38, 40 are arranged along the further movement axis 32 next to the cleaning regions 22, 24. The reprocessing apparatus 54 comprises a control and/or regulation unit 106. The control and/or regulation unit 106 is configured for a (CNC) controlling of the handling unit 20, in particular of the movement of the holding unit 18 along the movement axes 30, 32. The control and/or regulation unit 106 is configured for controlling the suction unit 46.

FIG. 3 shows a schematic perspective detail view of the holding unit 18. The holding unit 18 comprises a gripper unit 26. The gripper unit 26 is configured for gripping the tool unit 14, the tool 10 and the tool holder 12. The gripper unit 26 comprises a plurality of gripper elements 96. The gripper elements 96 are arranged on a, viewed in a vertical direction, underside of the gripper unit 26. The gripper elements 96 are arranged on a side of the gripper unit 26 that points toward the cleaning regions 22, 24. The gripper unit 26 shown exemplarily in FIG. 3 comprises three gripper elements 96. The gripper unit 26 is configured, depending on an implementation of the tool 10 that is to be gripped or the tool holder 12 that is to be gripped, to optionally grip the tool 10/the tool holder 12 by means of the gripper elements 96 along an outer circumferential direction of the tool 10/the tool holder 12 (this is the case with most tools 10) or to grip the tool 10/the tool holder 12 by means of the gripper elements 96 along an inner circumferential direction of a recess of the tool 10/the tool holder 12 (this is the case with most tool holders 12). FIG. 2 exemplarily illustrates the way in which the gripper elements 96 engage into a recess of a tool holder 12, thus holding the tool holder 12. The gripper elements 96 are supported so as to be radially movable relative to a shared central axis 98. The gripper elements 96 have inner gripping contours 100 on a side facing radially inwards. The inner gripping contours 100 are configured for holding a tool 10 or a tool holder 12 by a pressure acting radially inwards and created by the gripper unit 26. The gripper elements 96 have outer gripping contours 102 on a side facing radially outwards. The outer gripping contours 102 are configured for holding a tool 10 or a tool holder 12 by a pressure acting radially outwards and created by the gripper unit 26. The gripping contours 100, 102 are adapted to known outer or inner dimensions of tools 10 and tool holders 12. The gripper elements 96 of the gripper unit 26 are realized so as to be easily exchangeable (see releasable screws in FIG. 3). This advantageously allows flexibly adapting the gripper unit 26 to different tools 10 and/or tool holders 12. The gripper unit 26 comprises a gripper base 104. The gripper elements 96 are (exchangeably) mountable on the gripper base 104. The gripper unit 26, in particular at least the gripper base 104 with the gripper elements 96, is rotatable. The gripper unit 26, in particular at least the gripper base 104 with the gripper elements 96, is rotatable around the rotation axis 88 that is parallel to the central axis 98, preferably around the central axis 98. The control and/or regulation unit 106 is configured for a (CNC) controlling of the gripper unit 26, in particular of the rotation of the gripper unit 26 and/or of the movement of the gripper elements 96.

FIG. 4 schematically shows an enlarged, perspective-illustrated section of the reprocessing apparatus 54 with the cleaning regions 22, 24 and with the preserving regions 38, 40. The cleaning regions 22, 24 of the reprocessing unit 16 are configured for a vapor cleaning of the tools 10, the tool holders 12 and/or the tool units 14. The cleaning region 22 is herein configured for a vapor cleaning of outer sides of the tools 10, the tool holders 12 and/or the tool units 14, whereas the further cleaning region 24 is configured for a vapor cleaning of inner sides (for example recesses like tool receiving openings or tool receiving regions) of tool holders 12. The cleaning unit 34 comprises a cleaning device 72. The cleaning device 72 is configured to apply a cleaning vapor onto the tools 10, the tool holders 12 and/or the tool units 14. The cleaning device 72 comprises a cleaning nozzle 76. The cleaning nozzle 76 is arranged at least partially in the cleaning region 22. The cleaning nozzle 76 is arranged at least partially outside the cleaning region 22. The cleaning nozzle 76 is oriented toward the cleaning region 22. The cleaning nozzle 76 is configured to blow a cleaning vapor into the cleaning region 22. The cleaning nozzle 76 is configured to blow a cleaning vapor sidewise into the cleaning region 22. The cleaning nozzle 76 is arranged at least substantially perpendicularly to the movement axis 30. The cleaning nozzle 76 is arranged at least substantially parallel to the further movement axis 32. The cleaning device 72 comprises a cleaning lance 42. The cleaning lance 42 is arranged, in particular completely, in the further cleaning region 24. The further cleaning region 24 comprises the cleaning lance 42. The cleaning lance 42 is configured to blow a cleaning vapor into the further cleaning region 24. The cleaning lance 42 is configured to output the cleaning vapor in a radial direction extending around the cleaning lance 42. In the cleaning process on the tool holder 12, the cleaning lance 42 is configured to engage at least partly in the inner sides of the tool holder 12, in particular in a tool receiving opening (not shown) of the tool holder 12. The cleaning lance 42 is configured for a cleaning of inner spaces of the tool holder 12. The handling unit 20 is configured to put the tool holder 12 over the cleaning lance 42 by a movement along the movement axis 30.

The preserving regions 38, 40 of the reprocessing unit 16 are configured for a preserving of the cleaned tools 10, tool holders 12 and/or tool units 14 by a spraying of the tools 10, the tool holders 12 and/or the tool units 14 with a preserving fluid. The preserving fluid is realized as an oil mist. The preserving region 38 is herein configured for an oil-mist preserving of the previously cleaned outer sides of the tools 10, the tool holders 12 and/or the tool units 14, whereas the further preserving region 40 is configured for an oil-mist preserving of the previously cleaned inner sides of the tool holders 12. The preserving unit 36 comprises a preserving device 74. The preserving device 74 is configured to apply the preserving liquid onto the tools 10, the tool holders 12 and/or the tool units 14. The preserving device 74 comprises a nozzle 50, which is oriented at least substantially parallel to the movement axis 30. The nozzle 50 is implemented as a preserving nozzle 78. The preserving nozzle 78 is arranged at least partially in the preserving region 38. The preserving nozzle 78 is arranged at least partially outside the preserving region 38. The preserving nozzle 78 is oriented toward the preserving region 38. The preserving nozzle 78 is configured to blow the oil mist into the preserving region 38. The preserving nozzle 78 is configured to blow the oil mist sidewise into the preserving region 38. The preserving nozzle 78 is arranged at least substantially perpendicularly to the movement axis 30. The preserving nozzle 78 is arranged at least substantially parallel to the further movement axis 32. The preserving device 74 comprises a further preserving nozzle 80. The further preserving nozzle 80 is arranged, in particular completely, in the further preserving region 40. The further preserving region 40 comprises the further preserving nozzle 80. The further preserving nozzle 80 is configured to blow the preserving liquid into the further preserving region 40. The further preserving nozzle 80 is configured to blow the preserving liquid into the further preserving region 40 from below. In the preserving process of the tool holder 12, the further preserving nozzle 80 is configured to spray the preserving liquid into the inner sides of the tool holder 12, in particular into the tool receiving opening (not shown) of the tool holder 12. The further preserving nozzle 80 is configured for a preserving of surfaces situated in inner spaces of the tool holder 12. The handling unit 20 is configured to position the tool holder 12, in particular the tool receiving opening of the tool holder 12, above the further preserving nozzle 80 by a movement along the movement axes 30, 32.

FIG. 5 shows a schematic flow chart of a method for reprocessing, in particular for cleaning and/or preserving, the tools 10, tool holders 12 and/or tool units 14 by means of the reprocessing apparatus 54. The individual method steps of the method for reprocessing are additionally shown in FIGS. 6a to 6h. In at least one method step 108, a tool 10, a tool holder 12 and/or a tool unit 14 are/is fastened in the holding unit 18. In FIGS. 6a to 6h, preserving and cleaning of a tool holder 12 are shown by way of example. In the method step 108, the tool holder 12 is fastened in the holding unit 18 (see FIG. 6a) with an orientation of the tool receiving opening downward, i. e. toward the cleaning unit 34. In at least one further method step 110, the holding unit 18 is moved together with the tool holder 12 along the movement axis 30 downwards into the cleaning region 22 (see FIG. 6b). In at least one cleaning step 112, the cleaning nozzle 76 of the cleaning device 72 is activated. In the cleaning step 112, the cleaning vapor is sprayed onto the outer side of the tool holder 12. In at least one further cleaning step 82, with an activated cleaning nozzle 76, the tool holder 12 is moved by the holding unit 18. During the cleaning step 82, the holding unit 18 is moved up and down. Moreover, the holding unit 18 is optionally rotated during the cleaning step 82. In at least one further method step 120, the cleaning nozzle 76 is deactivated. In at least one further method step 122, the tool holder 12 is moved out of the cleaning region 22.

Figure 6B:
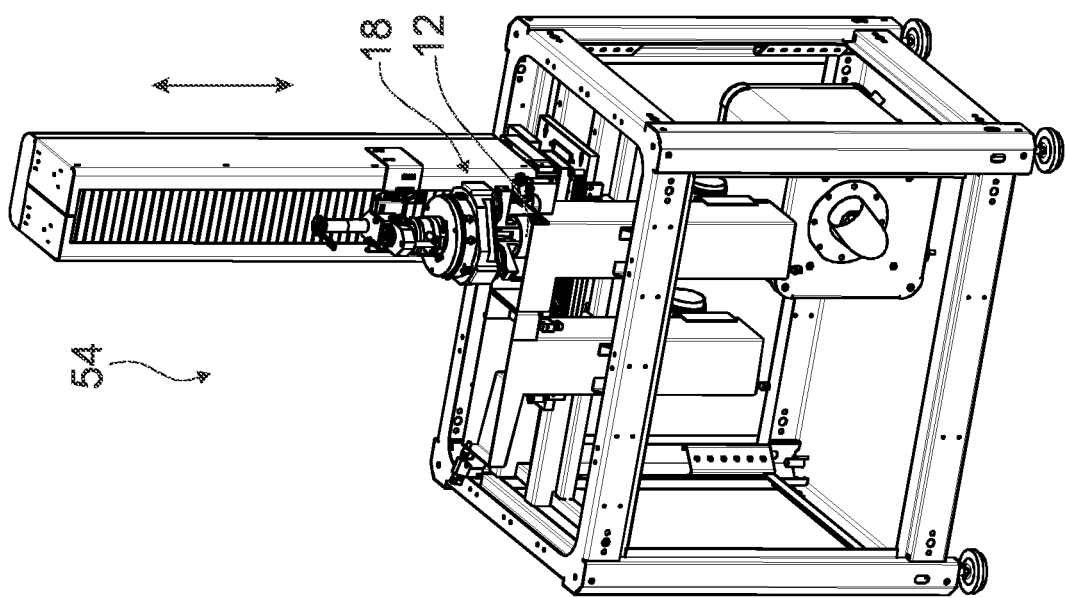
Figure 6A:
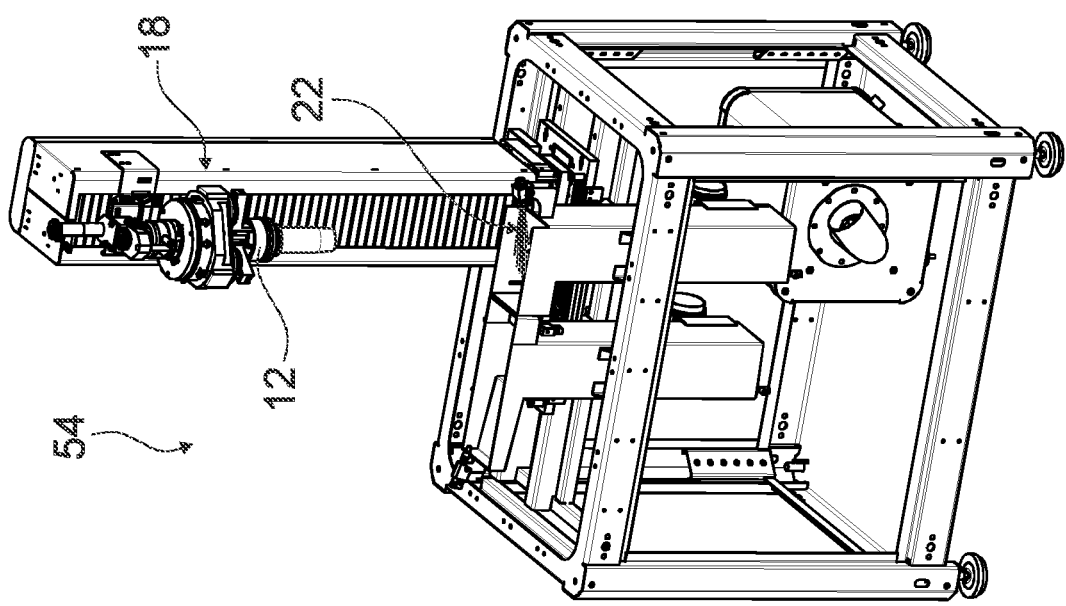
Figure 6D:
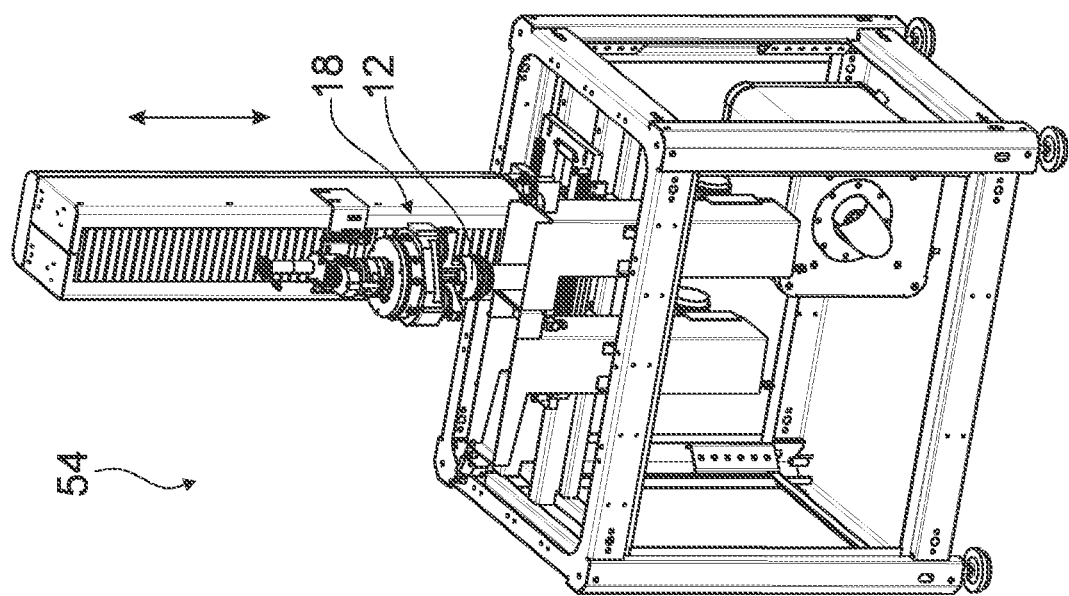
Figure 6C:
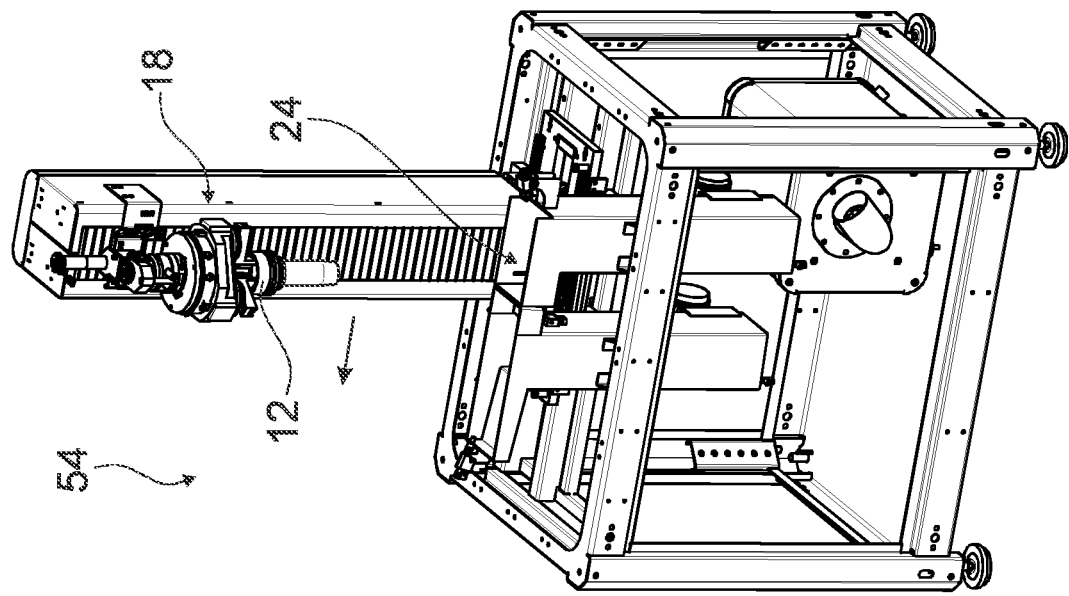
Figure 6F:
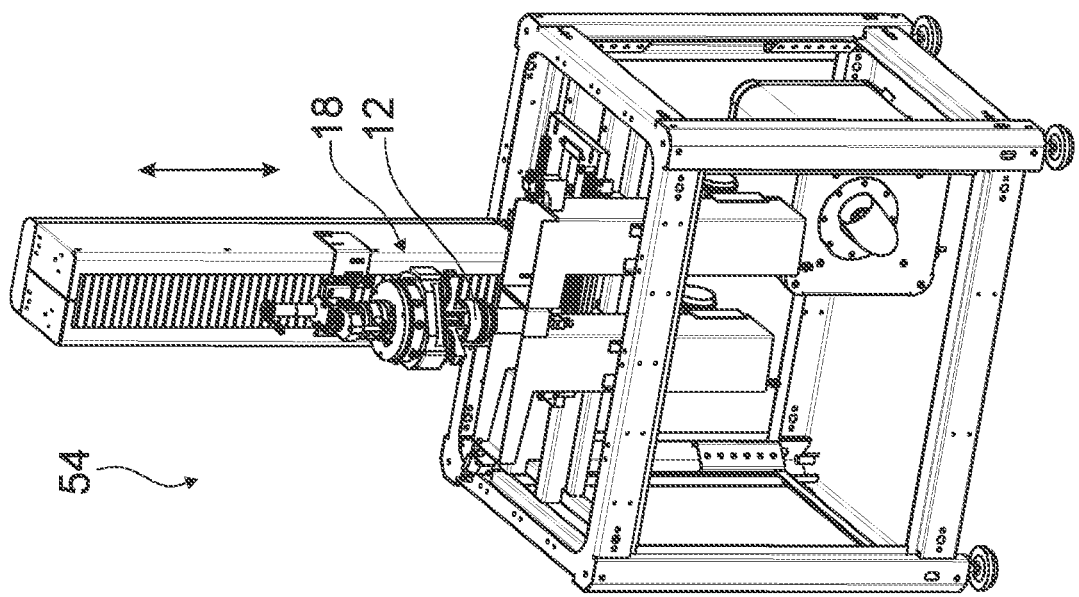

In at least one further method step 124, the holding unit 18 is moved along the further movement axis 32 until the tool holder 12 is positioned above the further cleaning region 24 (see FIG. 6c). In at least one further method step 126, the cleaning lance 42 is activated. In at least one further method step 128, the tool holder 12 is lowered by the handling unit 20 until a tool receiving opening of the tool holder 12 has been put over the cleaning lance 42. In the method step 128, the tool holder 12 is taken into the further cleaning region 24 (see FIG. 6*d*). In the method step 128, the cleaning lance 42 is introduced into an interior of a recess of the tool holder 12. In at least one further method step 130, cleaning vapor is sprayed into the interior of the tool holder 12. In at least one further cleaning step 132, with the activated cleaning lance 42, the tool holder 12 is moved by the holding unit 18. During the cleaning step 132, the holding unit 18 is moved up and down. Moreover, the holding unit 18 is optionally rotated during the cleaning step 132. In at least one further method step 134, the tool holder 12 is moved out of the further cleaning region 24. The method steps 126, 128, 134 and the cleaning steps 130, 132 concerning the further cleaning region 24 may be skipped in the case of a cleaning of tools 10 or tool units 14. Between the cleaning step 82 and a subsequent preserving step 84, the tool holder 12 is taken from one of the cleaning regions 22, 24 into one of the preserving regions 38, 40.

Figure 6E:
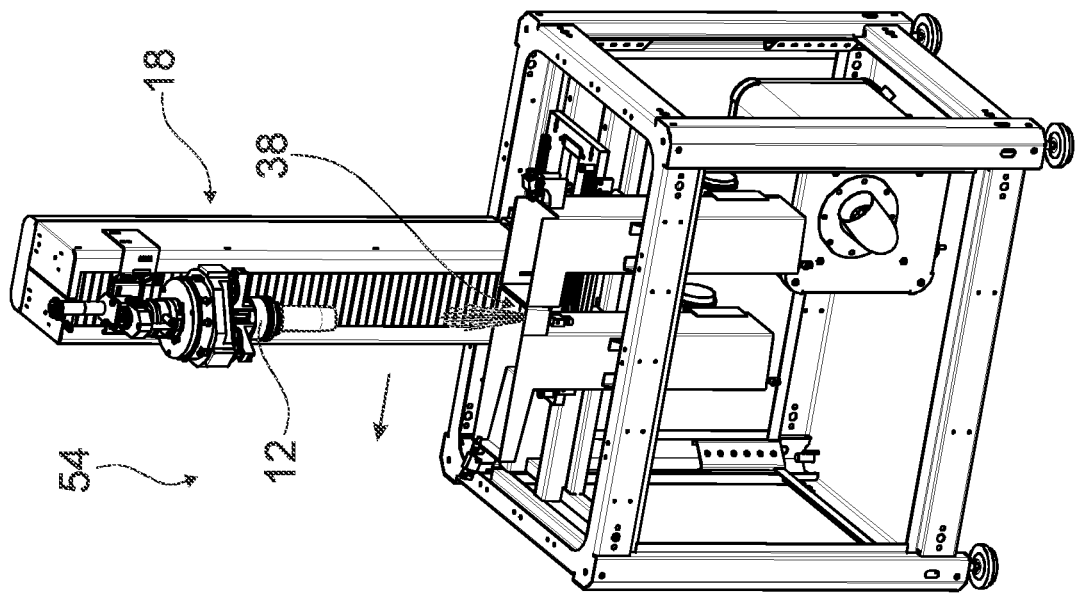
Figure 6H:
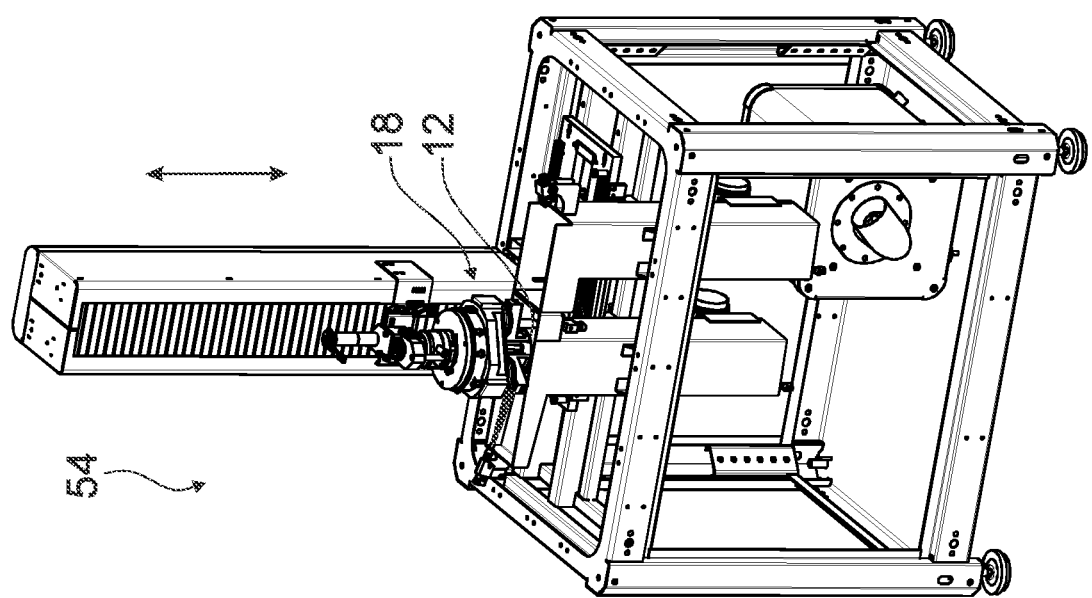

In at least one further method step 116, the holding unit 18 is moved along the further movement axis 32 until the tool holder 12 is positioned above the further preserving region 40 (see FIG. 6*e*). In at least one further method step 118, the further preserving nozzle 80 of the preserving device 74 is activated. In at least one further method step 136, the tool holder 12 is lowered by the handling unit 20 until a tool receiving opening of the tool holder 12 is positioned in a proximity above the further preserving nozzle 80 and until the tool holder 12 is arranged at least partially in the further preserving region 40. In the method step 136 the tool holder 12 is taken into the further preserving region 40 (see FIG. 6*f*). In at least one preserving step 138, an oil mist is sprayed into the interior of the tool holder 12. In the at least one further preserving step 84, with the activated further preserving nozzle 80, the tool holder 12 is moved by the holding unit 18. During the preserving step 84, the holding unit 18 is moved up and down. Moreover, the holding unit 18 is optionally rotated during the preserving step 84. In at least one further method step 140, the tool holder 12 is moved out of the further preserving region 40. The method steps 118, 136, 140 and the preserving steps 84, 138 concerning the further preserving region 40 may be skipped in the case of a preserving of tools 10 or tool units 14.

Figure 6G:
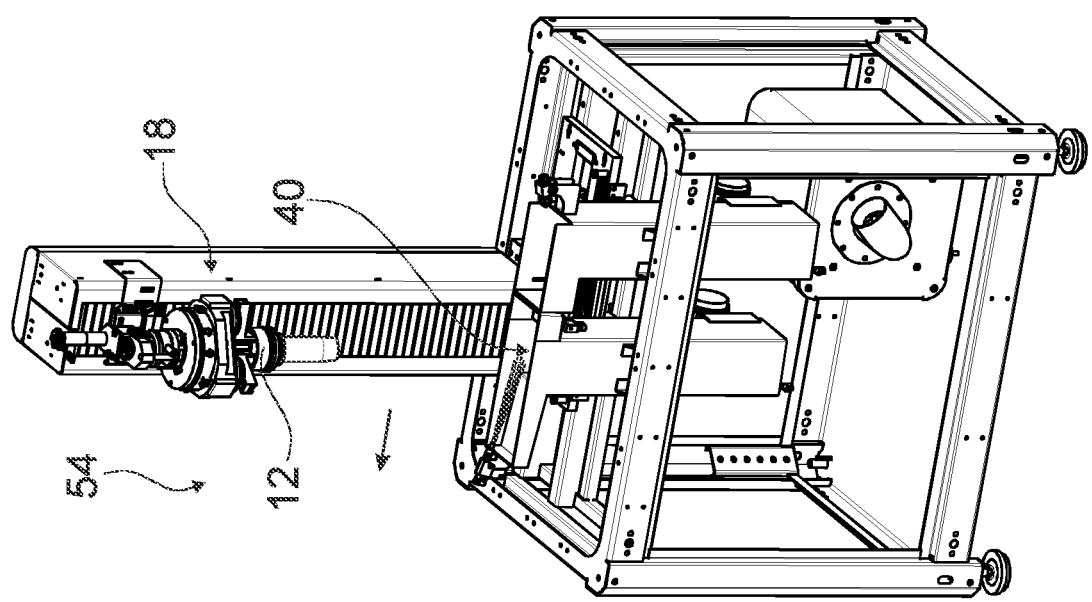

In at least one further method step 142, the holding unit 18 is moved along the further movement axis 32 until the tool holder 12 is positioned above the preserving region 38 (see FIG. 6*g*). In at least one further method step 146, the tool holder 12 is lowered by the handling unit 20 until the tool holder 12 is immerged at least partially in the preserving region 38. In the method step 146, the tool holder 12 is taken into the preserving region 38 (see FIG. 6*h*). In at least one further preserving step 144, the preserving nozzle 78 of the preserving device 74 is activated. In the preserving step 144, the oil mist is sprayed onto the outer side of the tool holder 12. In at least one further preserving step 148, with the activated preserving nozzle 78, the tool holder 12 is moved by the holding unit 18. During the preserving step 148, the holding unit 18 is moved up and down. Moreover, the holding unit 18 is optionally rotated during the preserving step 148. In at least one further method step 150, the preserving nozzle 78 is deactivated. In at least one further method step 152, the tool holder 12 is moved out of the preserving region 38. In the at least one further method step 152, the cleaned and preserved tool holder 12 is taken into a removal position by the handling unit 20. In at least one further method step 114, the cleaned and preserved tool holder 12 is removed out of the reprocessing apparatus 54.

REFERENCE NUMERALS

10 tool
12 tool holder
14 tool unit
16 reprocessing unit
18 holding unit
20 handling unit
22 cleaning region
24 further cleaning region
26 gripper unit
28 upper side
30 movement axis
32 further movement axis
34 cleaning unit
36 preserving unit
38 preserving region
40 further preserving region
42 cleaning lance
44 enclosure
46 suction unit
48 separator
50 nozzle
52 further enclosure
54 reprocessing apparatus
56 system
58 handling robot
60 tool clamping-in device
62 measuring and/or presetting apparatus
64 shrink-clamping device
66 cooling apparatus
68 tool assembly device
70 balancing station
72 cleaning device
74 preserving device
76 cleaning nozzle
78 preserving nozzle
80 further preserving nozzle
82 cleaning step
84 preserving step
86 tower
88 rotation axis
90 underside
92 underside
94 carriage
96 gripper element
98 central axis
100 gripping contour
102 gripping contour
104 gripper base
106 control and/or regulation unit
108 method step
110 method step
112 cleaning step
114 method step
116 method step
118 method step
120 method step
122 method step
124 method step
126 method step
128 method step
130 cleaning step
132 cleaning step 134 method step
136 method step
138 preserving step
140 method step
142 method step
144 preserving step
146 method step
148 preserving step
150 method step
152 method step
154 further tool clamping-in device

The invention claimed is:

1. A reprocessing apparatus with at least one reprocessing unit for a reprocessing of used and/or contaminated tools, tool holders and/or tool units, with at least one holding unit for an exchangeable holding of the tools, tool holders and/or tool units, and with at least one handling unit which is configured,
for an execution of a cleaning process on the tools, tool holders and/or tool units, to bring the holding unit and at least one cleaning region of the reprocessing unit together in an at least semiautomated manner, and
after execution of the cleaning process, to remove the holding unit and the cleaning region of the reprocessing unit from each other in an at least semiautomated manner, and/or after execution of the cleaning process, to bring the holding unit and at least one further cleaning region of the reprocessing unit together for an execution of a further cleaning process,
wherein the reprocessing unit comprises at least one cleaning unit with one or more cleaning regions and at least one preserving unit with at least one or more preserving regions, and
wherein at least one of the one or more preserving regions of the reprocessing unit is configured at least for preserving tools, tool holders and/or tool units by spraying the tools, tool holders and/or tool units with a preserving liquid.

2. The reprocessing apparatus according to claim 1, wherein the handling unit is configured to take the tools, the tool holders and/or the tool units into the cleaning region of the reprocessing unit in an at least semiautomated manner by a movement of the holding unit (18), and then, after execution of the cleaning process, to remove them from the cleaning region of the reprocessing unit in an at least semiautomated manner, and/or after execution of the cleaning process, to take the tool, the tool holder and/or the tool unit into the further cleaning region of the reprocessing unit in an at least semiautomated manner for an execution of the further cleaning process.

3. The reprocessing apparatus according to claim 1, wherein the holding unit comprises at least one gripper unit, which is configured for gripping a tool unit, a tool and/or a tool holder.

4. The reprocessing apparatus according to claim 1, wherein the holding unit is configured for holding and/or gripping a tool unit, a tool and/or a tool holder in such a way that an upper side of the tool, the tool holder and/or the tool unit points toward the cleaning region.

5. The reprocessing apparatus according to claim 1, wherein the handling unit is configured to rotate a tool unit, a tool and/or a tool holder, which are/is held and/or gripped by the holding unit, relative to the reprocessing unit.

6. The reprocessing apparatus according to claim 1, comprising at least one movement axis, along which a tool unit held and/or gripped by the holding unit, a tool held and/or gripped by the holding unit and/or a tool holder held and/or gripped by the holding unit are/is movable in an at least semiautomated manner.

7. The reprocessing apparatus according to claim 6, comprising at least one further movement axis, along which a tool unit held and/or gripped by the holding unit, a tool held and/or gripped by the holding unit and/or a tool holder held and/or gripped by the holding unit are/is movable in an at least semiautomated manner in a direction that is perpendicular to the movement axis.

8. A system with a reprocessing apparatus according to claim 1, and with a handling robot for an automated loading of the reprocessing apparatus with tools, tool holders and/or tool units, and/or for a removal of tools, tool holders and/or tool units from the reprocessing apparatus, and with one or several device/s from the following list of devices:
tool clamping-in device for an at least semiautomated clamping-in of tools in tool holders,
measuring and/or presetting apparatus for tools for an at least semiautomated presetting and/or measuring of tools, tool holders and/or tool units,
shrink-clamping device for an at least semiautomated inductive, thermal clamping-in and/or clamping-out of tools into and/or out of tool holders,
cooling apparatus for an at least semiautomated cooling of previously heated tool holders or tool units,
tool assembly device for an at least semiautomated assembly of multi-part tools,
balancing station for an at least semiautomated balancing of tool units.

9. The reprocessing apparatus according to claim 1, wherein the handling unit is configured to move the tool, the tool holder, the tool unit and/or the reprocessing unit during execution of the cleaning process.

10. The reprocessing apparatus according to claim 1, wherein the cleaning region of the reprocessing unit is configured at least for a vapor cleaning of outer sides of the tools, the tool holders and/or the tool units.

11. The reprocessing apparatus according to claim 10, wherein the further cleaning region of the reprocessing unit is configured at least for a cleaning for a vapor cleaning of inner sides of tool holders.

12. The reprocessing apparatus according to claim 11, wherein the further cleaning region comprises a cleaning lance, which is configured, in the cleaning process carried out on the tool holders, to engage at least partially into the inner sides of the tool holders.

13. The reprocessing apparatus according to claim 1, comprising an enclosure, which delimits one or both of the cleaning region and the further cleaning region at least on five sides.

14. The reprocessing apparatus according to claim 1, wherein the reprocessing unit comprises at least one suction unit.

15. The reprocessing apparatus according to claim 1, wherein the reprocessing unit comprises at least one separator.

16. The reprocessing apparatus according to claim 1, wherein the preserving liquid is an oil mist.

17. The reprocessing apparatus according to claim 1, wherein the reprocessing unit comprises at least one further preserving region, which is configured at least for a preserving of inner sides of tool holders.

18. The reprocessing apparatus according to claim 17, wherein the further preserving region comprises a nozzle, which is oriented at least substantially parallel to a movement axis of the tool holder held and/or gripped by the holding unit.

19. The reprocessing apparatus according to claim 1, comprising a further enclosure, which delimits one or both of the preserving region and the further preserving region at least on five sides.

20. The reprocessing apparatus according to claim 7 wherein the handling unit is configured to move the tool, the tool holder, the tool unit and/or the reprocessing unit during execution of the cleaning process and wherein the preserving region is arranged along the further movement axis next to the cleaning region.

21. A method for using the reprocessing apparatus according to claim 1 for a cleaning and/or preserving of tools, tool holders and/or tool units, wherein in one or both of a cleaning step and a preserving step, the tool, the tool holder and/or the tool unit are/is rotated and/or moved up and down within at least one of the cleaning regions and/or of the preserving regions, and/or wherein between the cleaning step and the preserving step, the tool, the tool holder and/or the tool unit are/is taken from one of the cleaning regions into one of the preserving regions.

22. A method for reprocessing tools, tool holders and/or tool units with a reprocessing apparatus according to claim 1, wherein in a cleaning step and/or in a preserving step, the tool, the tool holder and/or the tool unit are/is rotated and/or moved up and down within at least one of the cleaning regions and/or of the preserving regions and/or wherein between the cleaning step and the preserving step, the tool, the tool holder and/or the tool unit are/is taken from one of the cleaning regions into one of the preserving regions.

* * * * *

UNITED STATES PATENT AND TRADEMARK OFFICE
CERTIFICATE OF CORRECTION

PATENT NO. : 11,980,984 B2
APPLICATION NO. : 17/469633
DATED : May 14, 2024
INVENTOR(S) : Alexander Zoller, Christian Pfau and Andreas Reichardt It is certified that error appears in the above-identified patent and that said Letters Patent is hereby corrected as shown below:

On the Title Page

Item (73) The Assignee listed on Column 1, is incorrect. The correct Assignee name is:
E. ZOLLER GMBH & CO. KG EINSTELL- UND MESSGERAETE Signed and Sealed this
Seventeenth Day of September, 2024

Katherine Kelly Vidal
*Director of the United States Patent and Trademark Office*